Aug. 25, 1931.  R. F. MULLEN  1,820,151
OVERRUNNING CLUTCH
Filed May 10, 1929
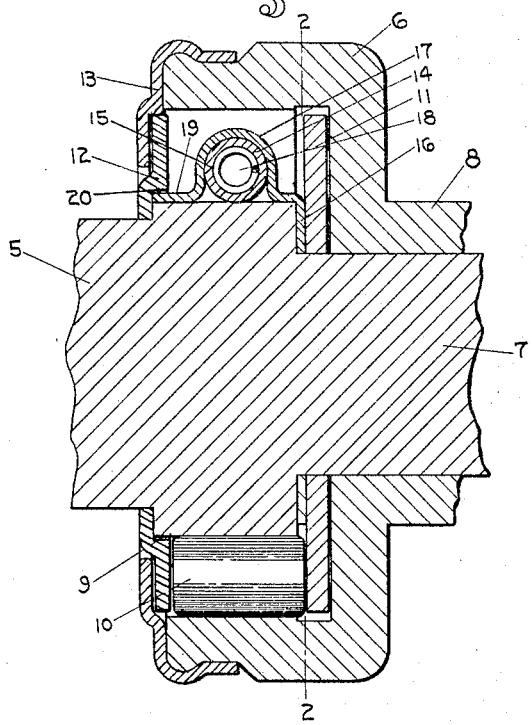
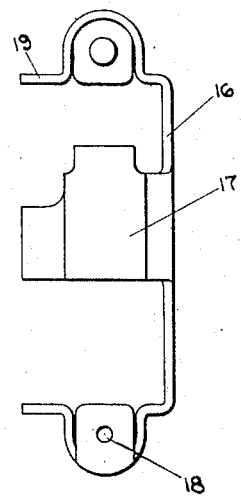
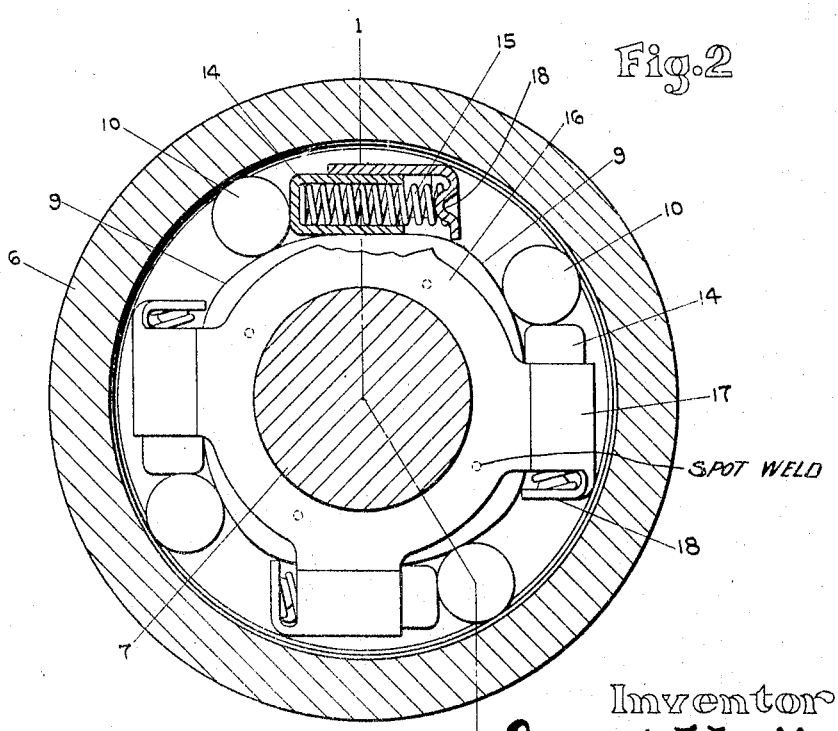
Inventor
Raymond F. Mullen
by his attorney
Farnum F. Dorsey Patented Aug. 25, 1931

1,820,151

UNITED STATES PATENT OFFICE

RAYMOND F. MULLEN, OF ROCHESTER, NEW YORK, ASSIGNOR, BY MESNE ASSIGNMENTS, TO NORTH EAST APPLIANCE CORPORATION, OF ROCHESTER, NEW YORK, A CORPORATION OF NEW YORK

OVERRUNNING CLUTCH

Application filed May 10, 1929. Serial No. 362,034.

This invention relates to over-running or one-way clutches, of the type in which a cylindrical outer member, or shell, and an inner member are arranged concentrically, with friction rollers interposed, the inner member having cam surfaces inclined to the inner surface of the shell, so that in one direction of relative rotation the rollers are pinched between the opposed surfaces, and thus lock the clutch members together for simultaneous rotation.

To insure the correct operation of the rollers it is customary to provide a spring follower of some sort behind each roller, the follower acting to press the roller in the direction in which it will pinch between the surfaces. A recess or guideway of some sort is necessary for each spring follower, and it has been usual to form these recesses in integral portions of the cam member, projecting radially between the cam surfaces. This arrangement has two disadvantages. In the first place, it makes necessary the use of a bar or forging of large diameter for the cam member, and in the second place it necessitates expensive milling and form-grinding operations for producing the intermediate cam surfaces.

The object of the present invention is to produce a clutch, of the type in question, in which the cam member can be formed inexpensively from stock of relatively small diameter, by means of simple operations, and particularly in which the cam surfaces may be produced by a continuous peripheral grinding operation which does not require the use of a formed grinding wheel. To the foregoing ends it is proposed, in accordance with the present invention, to provide guide recesses or pockets for the spring followers by means of a simple, inexpensive member which is mounted upon, but distinct from, the cam member, thus eliminating the integral extensions between the cam surfaces.

The invention consists in the construction hereinafter described, and illustrated in the accompanying drawings, as it is defined in the annexed claims.

In the accompanying drawings Fig. 1 is a longitudinal sectional view of a clutch embodying the present invention, taken approximately on the line 1—1 in Fig. 2; Fig. 2 is a section on the line 2—2 in Fig. 1, looking from right to left; and Fig. 3 is a side elevation of the guide member for the spring followers.

The invention is shown as embodied in a clutch comprising a central cam member 5, and an outer cylindrical member or shell 6. The cam member may be made integral with a shaft 7, on which the shell is journalled by means of an integral sleeve 8.

The cam member is shown as having four cam surfaces 9, of the usual eccentric form, while four rollers 10 are interposed between these cam surfaces and the inner surface of the shell. The rollers are confined endwise between two plates 11 and 12, attached to the cam member at opposite sides of the cam surfaces. A ring-shaped cap 13 is swaged upon the open end of the shell and overhangs the ring 12, so as to prevent axial displacement of the clutch members.

Each roller is provided with a spring follower in the form of a hollow plunger 14, inclosing a coiled compression spring 15. The guide member, in which the present invention particularly resides, is preferably formed of sheet metal, as shown particularly in Fig. 3. It comprises a flat ring 16 with four extensions from its outer edge. Each of these extensions projects laterally for a short distance from the edge of the ring, and is then arched into a partially cylindrical portion 17, which forms a pocket for the reception of one of the spring followers. One end of this portion 17 is closed by means of a lug 18, which provides a seat for the end of the spring 15. The extremity 19 of each extension is seated against the periphery of the cam member, and the ring 12 is provided with an inner annular shoulder 20, which overhangs these extremities, as shown in Fig. 1, so as to sustain the extension against any tendency to spring outwardly, in consequence of centrifugal force when the clutch is rotated at high speed.

The guide must be fixed against rotation with respect to the cam member, and this may be accomplished in any convenient manner as, for example, by fitting it tightly upon the cam member. It may also be conveniently secured by spot welding the ring portion 16 to the adjacent surface of the cam member, as indicated by dotted circles in Fig. 2.

It will be evident that the construction which has been described permits the formation of the cam member with a smooth periphery having no reentrant portion, so that this member may be formed by continuous peripheral milling and form grinding operations of the simplest character, while the maximum diameter of the cam member is only that necessitated by the form of the cam surfaces.

The invention claimed is:

1. In an overrunning clutch comprising a shell member, a cam member inside the shell, intermediate rollers, and a spring urged plunger for each roller and extending at right angles to the axis of the roller, the combination, with the cam member, of a ring attached thereto, at one side of the cam, and provided with pockets extending laterally into alinement with the cam surfaces and serving as supports and guides for the spring urged plungers.

2. In an overrunning clutch comprising a shell member, a cam member, intermediate rollers, and a spring follower for each roller, the combination, with the cam member, of two rings mounted thereon at opposite sides of the cam surfaces, and pocket members serving as supports and guides for the spring followers, each pocket member being supported, at each side, by one of said rings and being arched away from the cam member between its lateral points of support.

3. In an overrunning clutch comprising a shell member, a cam member, intermediate rollers, and a spring follower for each roller, the combination, with the cam member, of two rings mounted thereon, at opposite sides of the cam surfaces, and pocket members extending integrally, from one of said rings, to and into interlocking engagement with the other ring, the pocket members being formed, at their intermediate portions, to provide guides and supports for said spring followers.

4. A guiding and supporting means for the spring urged plungers of an overrunning clutch, comprising a flat ring, and a series of integral extensions, from the outer edge of the ring, in the form of part-cylindrical pockets each closed at one end and at the outer side, so as to be adapted each to confine a spring urged plunger against the periphery of the cam member of the clutch.

5. In an overrunning clutch, the combination of a shell member, a cam member within the shell having a periphery including a plurality of cam surfaces and intermediate surfaces spaced at a substantial distance from the inner surface of the shell member, rollers interposed between the cam surfaces and the shell member, a plunger urged by a helical spring for each roller, and located in a space between an intermediate surface and the shell member, and a flat ring attached to the cam member, at one side of the cam surfaces, having integral lateral projections extending into said spaces and serving as supports for the spring urged plungers.

RAYMOND F. MULLEN.